Figure 3:
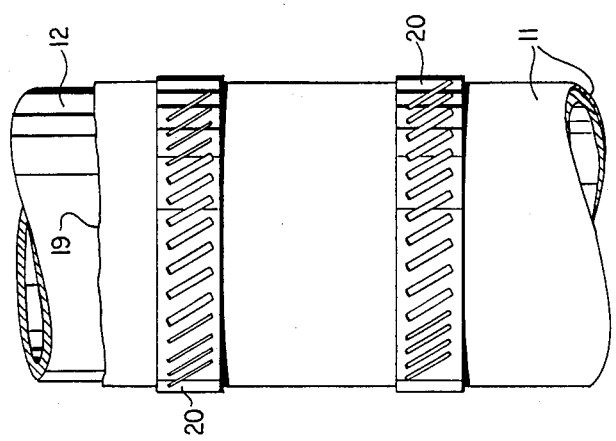

United States Patent [19]

Butts

[11] Patent Number: 4,672,366
[45] Date of Patent: * Jun. 9, 1987

[54] SUBTERRANEAN TANK LEAK CONTAINMENT AND DETECTION SYSTEM

[75] Inventor: Nicholas E. Butts, Ontario, Canada

[73] Assignee: Total Containment International, Inc., Ottawa, Canada

[ * ] Notice: The portion of the term of this patent subsequent to Feb. 4, 2003 has been disclaimed.

[21] Appl. No.: 792,737

[22] Filed: Oct. 29, 1985

Related U.S. Application Data

[63] Continuation-in-part of Ser. No. 514,615, Jul. 18, 1983, Pat. No. 4,568,925, which is a continuation-in-part of Ser. No. 335,818, Dec. 30, 1981, abandoned.

[30] Foreign Application Priority Data

Jan. 9, 1981 [CA] Canada ................................ 368169

[51] Int. Cl.⁴ ...................... G01M 3/40; G08B 21/00
[52] U.S. Cl. ...................................... 340/605; 73/492
[58] Field of Search ............ 73/49.2, 49.3, 40, 40.5 R; 340/605; 220/466, 469, 461

[56] References Cited

U.S. PATENT DOCUMENTS

| | | |
|---|---|---|
| 3,564,526 | 2/1971 | Butts . |
| 3,995,472 | 12/1976 | Murray ................................... 73/40 |
| 4,161,957 | 7/1979 | Schoellkopf ................ 73/40.5 R X |
| 4,288,653 | 9/1981 | Blom et al. .................... 73/40.5 R X |
| 4,305,068 | 12/1981 | Klein ................................... 73/40 X |
| 4,568,925 | 2/1986 | Butts ............................... 73/49.2 X |

FOREIGN PATENT DOCUMENTS

| | | |
|---|---|---|
| 690249 | 7/1964 | Canada . |
| 775748 | 1/1968 | Canada . |
| 775758 | 1/1968 | Canada . |
| 978614 | 11/1975 | Canada . |
| 1120131 | 3/1982 | Canada . |
| 2329525 | 1/1975 | Fed. Rep. of Germany ....... 73/49.3 |
| 135689 | 11/1978 | Japan ..................................... 73/40 |
| 155886 | 12/1979 | Japan . |
| 6133 | 1/1981 | Japan ..................................... 73/40 |

Primary Examiner—Stewart J. Levy
Assistant Examiner—Joseph W. Roskos
Attorney, Agent, or Firm—Cushman, Darby & Cushman

[57] ABSTRACT

An improved system for containment and detection of leakage of petroleum products from a subterranean storage tank is disclosed wherein the tank is provided with leak sensing means positioned at one end of the tank and the tank, together with the leak sensor, is enclosed in an impervious enclosure which is sealed about the tank to prevent actuation of the leak sensor except due to leakage from the tank. In one form the leak sensor may be housed in a perforated duct which extends through and is sealed within the enclosure permitting access to the leak sensor and the interior of the enclosure in the event that a leak is detected. A preferred material for use in making the enclosure is welded linear high density polyethylene (HDPE). In a second preferred form, a drainage mesh is positioned between the tank and the enclosure to ensure that any leakage from the tank drains to the leak sensor, and an absorbent strip is positioned beneath the tank and inside the enclosure to conduct leakage to the sensor.

13 Claims, 10 Drawing Figures

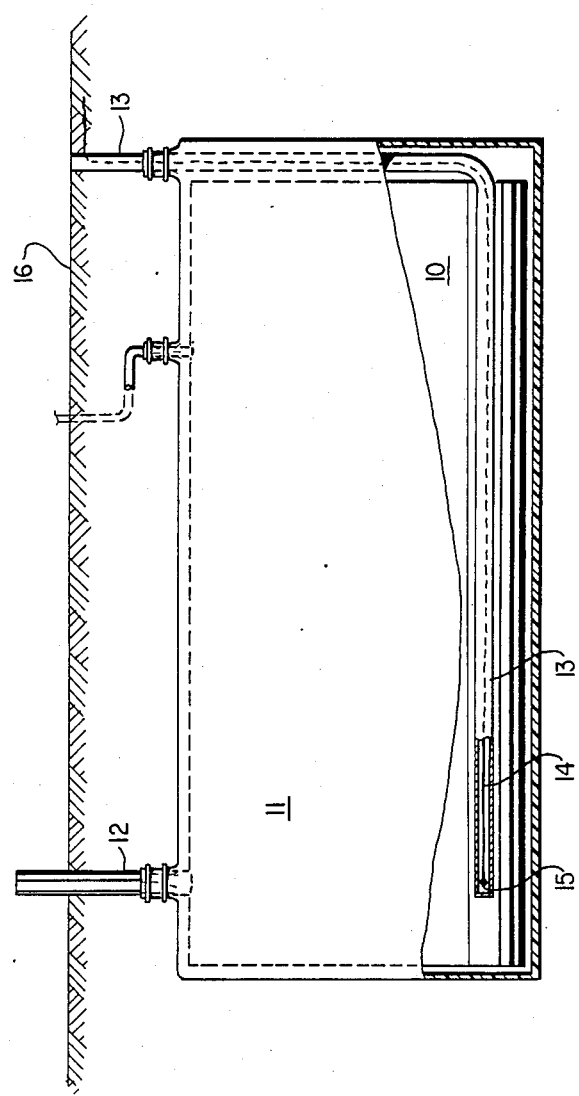

SUBTERRANEAN TANK LEAK CONTAINMENT AND DETECTION SYSTEM

PREAMBLE

This application is a continuation in part of application Ser. No. 514,615, filed July 18, 1983, now U.S. Pat. No. 4,568,925, issued Feb. 4, 1986; which is a continuation-in-part of application Ser. No. 335,818, filed Dec. 30, 1981, now abandoned.

The present invention relates to the field of leak containment and detection, and is concerned with improvements in containment and detection of leaks from underground storage tanks, for example, tanks used for storage of gasoline or other petrochemicals.

Many hundreds of thousands of fuel storage tanks are located underground, particularly in service stations, and leakage from these tanks is a continuing concern. Undetected leakage from such tanks is wasteful in the loss of a non-renewable energy source, and creates hazards to public safety by contaminating subsurface earth formations or ground water sources, or by leaking into storm sewers, to create a fire and explosion hazard.

Frequently where new subterranean tanks are installed to replace failed tanks, the ground has already been contaminated by previous leakage or spillage of fluids, so that the installation of leak sensing devices adjacent the new tank or pipe will result in a false indication of leakage. There is a requirement for a leak containment and detection system which is insensitive to contamination of the environment resulting from leakage not associated with the container to be protected, is similary immune to spillage of products during refilling or when products are drawn from the container during use, will contain any product leaked from the protected tank, and gives a prompt alarm when such a leak occurs.

All of the above criteria are met by the improved method and system of the present invention in which leakage of petroleum products from a subterranean tank is contained in an enclosure having a leakage sensor positioned within the enclosure. The enclosure may then be sealed to prevent spillage of petroleum products or soil contamination from causing erroneous leak indications to be generated. The enclosure effectively contains leakage from the tank until repair or replacement can be effected.

In a preferred form, the present invention provides a method of containing and detecting leakage from a subterranean tank containing a petroleum product such as gasoline or heating oil, by providing adjacent the tank an electrical leak detecting cable of the type that has an insulator that is subject to degradation by the petroleum product, enclosing the cable and tank together in an enclosure impervious to the product, sealing the enclosure to prevent the ingress of the product due to accidental spillage or from other sources of the product, and connecting the cable to an electrical sensor whereby leakage from the tank into the sealed enclosure is detected by the cable and electrical sensor.

Leakage may occur from underground storage tanks from a number of causes. Since most tanks are steel, internal and external corrosion resulting in perforation of the tank is probably the primary causes of leakage. Internal corrosion results from the presence of water or acids in the stored products. External corrosion is due to groundwater and other soil-borne corrosives. Leaks may also be caused by cracks or by punctures due to sharp stones, pressing on the tank wall. In extremely dry, porous soils punctures might occur in such a way as to prevent leakage from the tank reaching the leak detector. In order to prevent this, and to ensure that any leak from the tank reaches the leak sensor in a minimum time, the present invention provides two additional important features. Firstly, a drainage mest is wrapped around the tank, inside the enclosures, and secondly, an absorbent geotextile is placed along the bottom of the tank. This latter material collects and hold leaking products so that it cannot escape to the enviroment without being detected. An acceptable form of drainage mesh is sold by Tensar Corporation, Marrow Ga., as TENSAR drainage net. A suitable geotextile absorber is sold by American Engineering Fabrics Inc. 1 Coffin Avenue, New Bedford, Mass., 02746 U.S.A.

In accordance with a preferred form of the invention, the leak sensor is positioned in a perforated duct inside the enclosure adjacent the tank so that leakage from the tank will penetrate the duct, and be detected by the leak sensor. The perforated duct thus can be used to gain access to the leak detection cable.

Conveniently, both ends of the cable may extend outside the enclosure (in suitable protective sleeves), one end being connected to a suitable monitor, for example, the Total Containment Inc. model M105B, the other end being terminated by a fixed resistance. With this configuration, the cable may be replaced after destruction by leakage by using the destroyed cable to pull a new cable through the duct, after the source of leakage has been pinpointed and the leaking container repaired and resealed. For example, in large tanks, repairs are frequently made from inside the tank, and the enclosure may be cleansed using a flushing technique with detergents, to rehabilitate the interior of the enclosure, thus avoiding the necessity of excavation.

Figure 2:
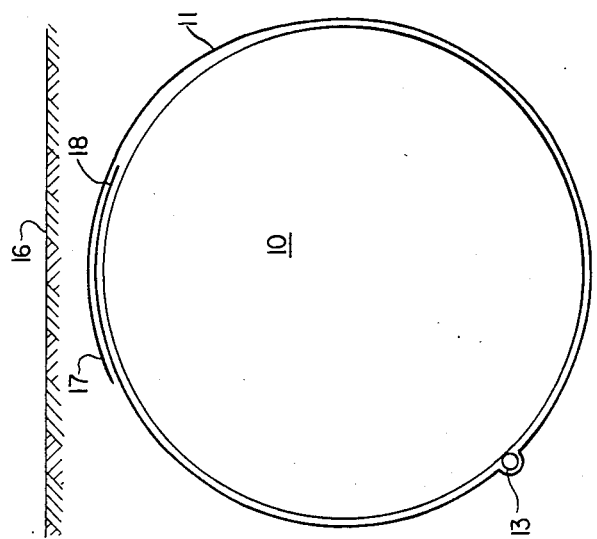
Figure 4:
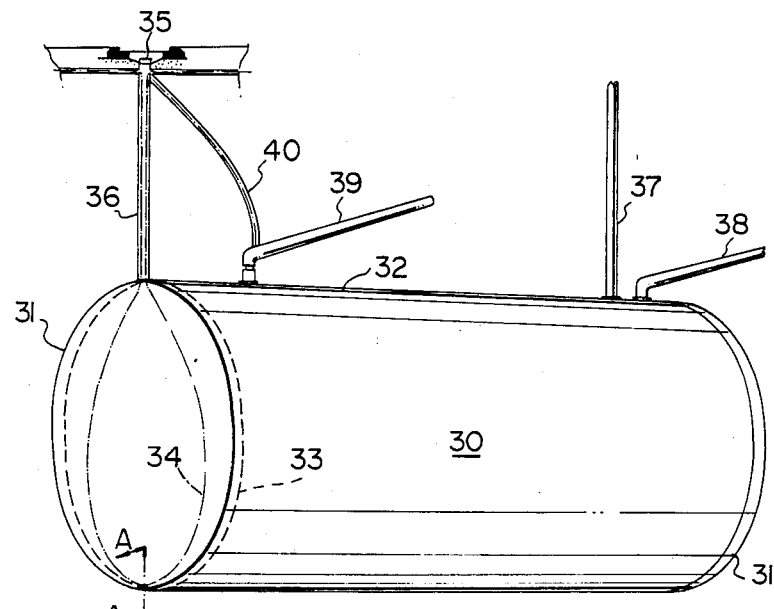
Figure 5:
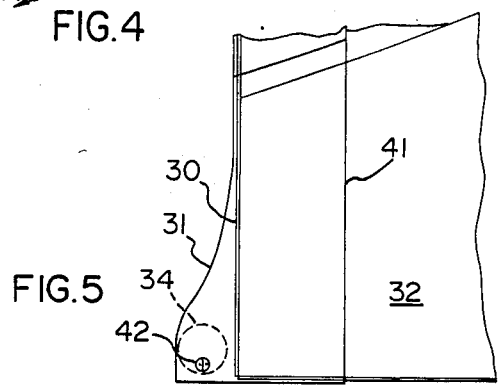
Figure 6:
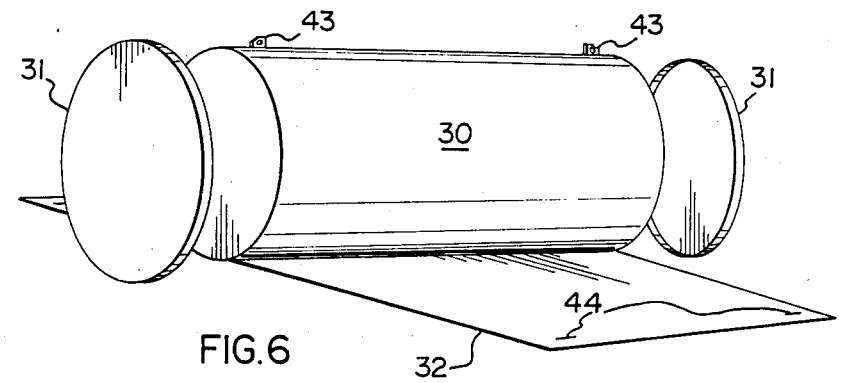
Figure 7:
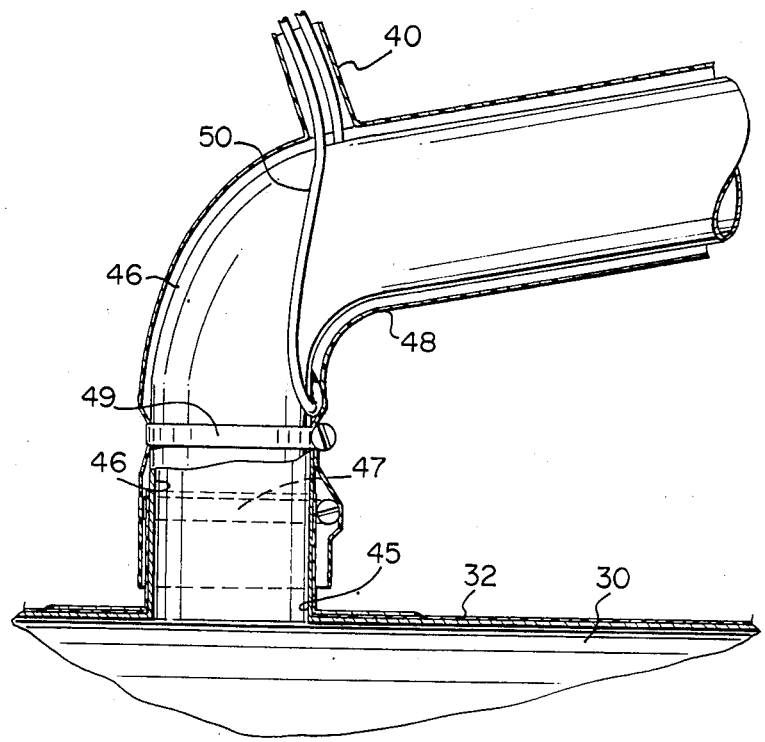
Figure 8:
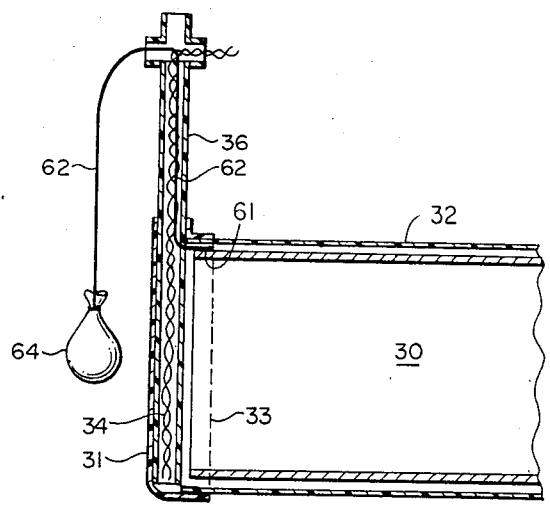
Figure 9:
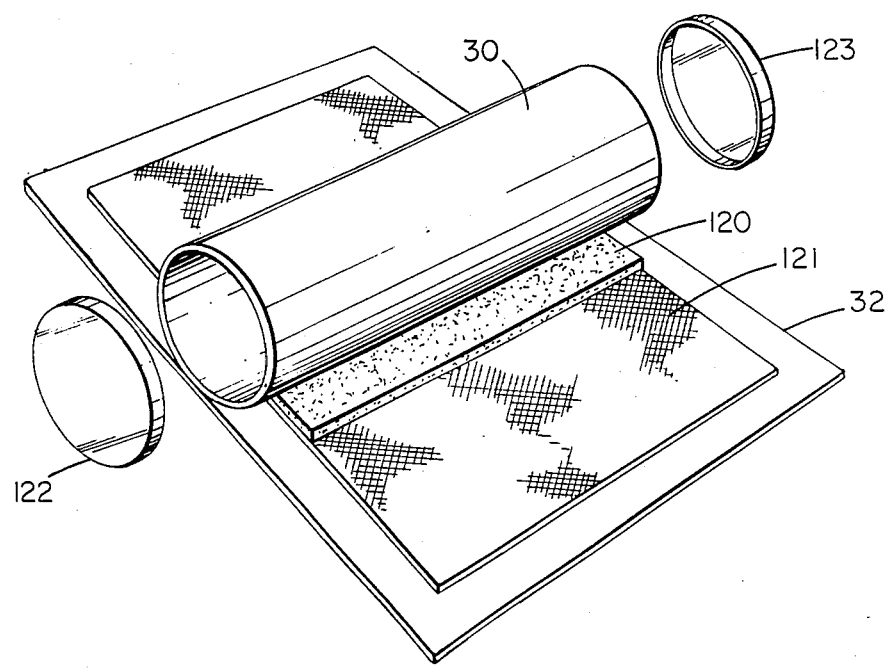
Figure 10:
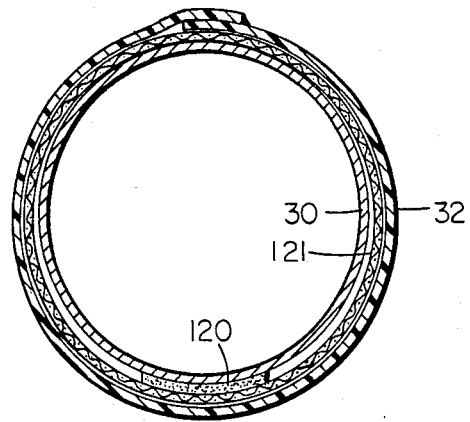

In the drawings which illustrate embodiments of the present invention and its use, FIG. 1 is a vertical longitudinal section through a typical cylindrical subterranean tank protected in accordance with the present invention, FIG. 2 is a transverse vertical section of the tank of FIG. 1, FIG. 3 is a detailed view of the filler pipe in FIG. 1, FIG. 4 is a view partly in section of an alternative form of enclosure and leak detection system in accordance with the invention, FIG. 5 is a detailed view on the line A—A of FIG. 4, FIG. 6 is a perspective view illustrating the assembly of an alternate form of leak detection enclosure, FIG. 7 is a detailed view of the Pump Piping of FIG. 4, FIG. 8 illustrates the application of cathodic protection to a tank, FIG. 9 is a perspective view illustrating the application of a preferred form of secondary containment to a fuel storage tank, FIG. 10 is a cross-section through a fuel tank with the secondary containment system in place.

DETAILED DISCLOSURE

In FIG. 1 there is shown a tank 10 sealed within a secondary containment enclosure. Extending through the enclosure is a fill pipe 12 and a leak detection duct 13. Located within the duct 13 is a leak sensor cable 14 terminated with a resistor 15. The entire installation is below ground level 16.

In order to seal the tank 10, and duct 13 in the enclosure 11 and as illustrated more clearly in FIG. 2, the end of the flaps 17 and 18 of the enclosure 11 are folded over and may be sealed together with a commercially available weld to complete the installation of the enclosure 11.

FIG. 3 illustrates one way in which the enclosure 11 may be sealed to the filler pipe 12. As illustrated the enclosure 11 is drawn up around the filler pipe 12 to a point 19, and screw clamps 20 may be used together with a suitable sealer to complete the sealing of the enclosure 11 about the filler pipe 12. Clay might be added to completely isolate this whole section from contaminated ground.

Several advantages flow from the use of the system of the present invention. A principal advantage is that it is now possible to use a bare steel tank in an underground location without premature failure of the tank due to corrosion. Such bare steel tank is the least expensive container for storing fuels, but is not presently used because of leakage caused by corrosion. The tank 10 being entirely sealed in the enclosure 11 is completely isolated from any of the corrosive effects due to its environment. One form of the enclosure material particularly suitable for use with the invention is linear high density polyethylene (HDPE).

Linear HDPE may, of course, be welded with commercially available plastic welding tools, available for example from Munsch Chemiepumpen GmbH.

The leak detection duct 13 used in FIG. 1 and FIG. 3 can be formed for example from one inch diameter perforated HDPE pipe.

After installation the enclosure is sealed around the top of the tank and all piping including the leak detection duct, so that no spills will find their way into the space between the tank and the enclosure. Any product then getting into this space must come from the tank where its presence will activate the sensor cable alerting the responsible person that the tank has developed a leak.

Many advantages are realized using the system of the present invention. First of all a 24 hour a day watch is maintained on the integrity of the tank and there is no need for independent test or other special procedures such as have been proposed and are presently in use in association with underground fuel storage tanks. Because the tank is isolated from the soil by the insulated enclosure there is no need for cathodic protection or other steps or measures to reduce or prevent corrosion. Cathodic protection can however be applied using cathodic protection conductors with a HDPE insulation that can be welded to the same material which comprises the enclosure. Further, in accordance with the invention, it has been found that a more economical solution to the problem of fuel storage and leak detection is provided.

The use of the duct containing the sensor cable also provides a significant further feature for the invention since, should petroleum products for any unforesen reason other than by a leak get into the space between the tank and the enclosure, it is quite simple to circulate water with or without detergent added through the duct and flush out the product and replace the sensor cable.

The system of the present invention provides a significant further advantage in the event of a leak in that the enclosure is capable of retaining the leak and avoiding unnecessary contamination of the surrounding environment. With the system of the present invention underground storage tanks can be maintained in a controlled environment free from moisture and harmful chemicals in the surrounding ground. By controlling the Ph and moisture in the enclosure containing the tank, corrosion of tanks can be kept to a minimum. Thus it is no longer necessary to use expensive fiber glass storage tanks which are vulnerable to solvents in the ground water.

A further advantage of the invention is that in the event of a leak or sudden failure of the tank any product in the tank will not be lost to the environment where it is able to pollute the surrounding ground water. The enclosure retains all of the lost product within its walls so that it may be removed safely and without contamination of the product or of the surrounding area.

The material used for the enclosure of the present invention is strong, water and oil resistant. The enclosure is formed from three prefabricated sections; two end caps which are of the desired diameter with a six inch lip and one body sheet the same length as the tank, as wide as the circumference of the tank plus two feet. The enclosure is welded together on site using a commercially available HDPE welding process. In a typical installation, the site excavation is dug in the normal manner with a six inch layer of compacted sand placed on the bottom. The leak detection duct 13 may be laid in the form of a letter L or preferably the letter U with the vertical end(s) rising to the ground level 16, while a horizontal run is along the bottom, right on the material of the enclosure.

After the tank 10 and the leak detection duct have been installed within the enclosure 11 the enclosure can be welded together. Prior to sealing it is also possible to add chemicals in the bottom of the enclosure to inhibit corrosion of the steel storage tank. When the top flaps are sealed, holes are cut for fill pipes, vent pipes and pump pipes. Special sleeves or "chimneys" may be made for these pipes and welded to the enclosure so that all connections are protected to the ground surface as illustrated in FIG. 3. These sleeves may be clamped with a screw clamp 20 approximately six inches below the ground level 16, filled with silicon grease and then sealed with a second clamp as illustrated in FIG. 3. Impervious clay can then be used to further isolate this area to prevent liquids from entering the bag.

After sealing the upper end of the top flap 17, the enclosure should be completely sealed so that no moisture is able to get into the liner where it is able to affect the tank 10.

Where the leak detection duct 13 comes to ground level 16 a man-hole (not shown) may be placed so that it will be slightly below final grade and not affected by any surface equipment such as snowplows or the like.

A sensor cable 14 is installed within the leak detection duct 13. A suitable form of cable is disclosed in Canadian Pat. No. 775,758 of Jan. 9, 1968 to E. O. Butts (corresponding to U.S. Pat. No. 3,564,526) and Canadian Pat. No. 978,614 of Nov. 25, 1975 to Wolkowski, contents of all of which are incorporated hereinto by reference. As disclosed therein, a twisted pair of conductors are separated by insulation materials which are subject to degradation upon contact with petroleum products such as gasoline or heating oil. Sufficient degradation alters the resistance between conductors and ultimately allows the conductors to come into contact with each other and thereby energize an alarm.

It is also within the scope of the invention to preassemble the enclosure, duct, sensor, and tank, to factory seal the preassembled unit, which may then be installed in a suitable excavation, and connected to filler pipes and leak detection monitors.

Many advantages are obtained in the use of a system of the present invention.

1. The tank is now in a moisture and chemical free controlled environment.
2. Leak detection is fast and accurate.
3. Leak detection is not vulnerable to spills or existing contamination in the surrounding ground.
4. Leaks are retained so that expensive clean-up spills can be avoided.
5. Leak clean-up is fast, easy and thorough.
6. Leaking tanks can be accurately identified.
7. Old steel tanks can be reclaimed and used again since corrosion can now be controlled. This makes retrofitting older gas stations for example a feasible solution because their tanks will probably not require changing but can merely be excavated, fitted with an enclsoure, duct and sensor and reinstalled. Additionally, all fittings and piping are enclosed in the enclosure so that these can be monitored for leaks also.

It is estimated that the cost of installing the applicant's leak detection system would add about 30 percent to the cost of a basic installation of a bare steel tank. As against this, however, is the fact that a bare steel tank would be subject to corrosion depending upon the nature of the soil in which it is buried, and it is not equipped with any adequate means for detecting leakage except by use of conventional inventory control practices. However, the savings involved in early leak detection together with the extended life of the tank clearly indicates that the cost of the applicant's improved leak detection system should be recaptured during the life of the tank.

FIG. 4 illustrates an alternative form of enclosure for use with a bare steel tank, particularly useful for example in the service station environment. As illustrated the tank 30 is enclosed in a linear HDPE enclosure consisting of a pair of molded end caps 31 and a body sheet 32. The end of the cylindrical tank 33 is spaced from the inner end of the end cap 31, to provide a space for the applicant's preferred one inch perforated duct containing the leak detection cable 34. It will be noticed the leak detection cable and duct 34 extend to the bottom edge of the tank to provide the earliest possible sensing of any leakage which may occur from within the tank. The duct 34 is connected to a test point at the surface 35 by an impervious HDPE chimney fitting 36 welded to the end cap 31. The fill pipe 37 and vent pipe 38 are both encased in HDPE chimney fittings similarly welded to the body sheet 32. The piping to pumps 39 may be similarly protected with an appropriate chimney fitting of HDPE, and in addition in accordance with a further feature of the invention may be provided with leak detection cable for sensing leaks in the piping to the pumps which leak detection cable may be connected via a further impervious HDPE pipe 40 to the test point 35. The detail of the interconnection of the piping to pumps 39 and the pipe 40 is illustrated in FIG. 7.

FIG. 5 illustrates a detail of the junction between the end cap 31 and the body sheet 32 at the point A—A of FIG. 4. As illustrated, the end cap 31 overlaps the body sheet 32 and is welded thereto with an HDPE weld at 41. The perforated duct 34 containing the sensor cable 42 passes along the bottom edge of the end cap 31 such that any leakage from the tank 30 will contact the sensor cable 42 at the earliest opportunity, to give indication of such a leak.

FIG. 6 illustrates the assembly of the applicant's enclosure to a typcial gasoline storage tank. Such tank 30 is equipped with lifting lugs 43 for lifting and positioning the tank. In a conventional installation the body sheet 32 is positioned in the excavation in which the tank 30 is to be installed, the tank is placed on the body sheet 32, and the ends of the sheet are then wrapped around the tank, appropriate slits 44 being provided to accommodate the lifting lugs 43. The body sheet 32 is then welded to itself with the tank inside the sheet. Subsequently the end caps 31 containing the perforated duct 34 and leak detection cable 42 are mounted on the ends of the tank, and the end caps 31 are welded to the body sheet using known high density polyethylene welding techniques. Patches are welded over the lifting lugs. With the tank entirely sealed in the high density polyethylene container all leakage from the tank is completely prevented.

A preferable material for use as the body sheet and end caps is linear high density polyethylene the thickness of the sheet material is at least 0.100 inch.

The enclosure components may be prefabricated to the tank dimensions and shipped to the tank manufacturer where the components are permanently attached to the tank to protect the tank during transportation. On site the tank may be pressure tested according to local requirements. If the enclosure is to be applied on site, the body sheet and end caps can be shipped as a kit and welded to the tank. The leak detection cable is fitted into the end fittings, and the entire enclosure is welded together on the tank prior to burial. The piping to the pumps, filler pipes and vent pipes can also be fitted with separate leak detection systems. Special chimney fittings are designed to fit over the tank piping and are clamped to the pipes with the bases welded to the enclosure so as to prevent liquids from entering the enclosure at these locations. All wiring connections are done after backfilling so as to allow the tanks and piping systems to be monitored by a single monitor.

FIG. 7 illustrates a detail of FIG. 4 in which a tank 30 sealed within a body sheet 32 is provided with a chimney fitting 45 also welded to the body sheet 32 through which piping to the fuel dispensing pumps is passed. As illustrated in FIG. 7 the chimney fitting 45 is clamped to the pipe 46 by a clamp 47, and a further HDPE sleeve 48 is fitted over the piping 46 and the chimney 45, and is clamped by a screw clamp 49 about the piping 46. Within the sleeve 48, a further leak detection cable 50 contained within a non-perforated duct 40 is looped around the piping 46 just above the clamp 49, to provide a mechanism for detecting leaks in the piping 46 which might otherwise go undetected, or which, if clamps 47 and 49 were not provided on the piping 46, leak back into the enclosure to give an erroneous detection of a leak in the tank per se.

FIG. 8 illustrates the application of cathodic protection to a tank positioned in an enclosure in accordance with the invention. The tank 30 is provided with a standard cathodic protection cable 62 welded at 61 to the tank 30. The other end of cable 62 is attached to a bag of chemicals 64. The cable 62 is fed through the HDPE pipe 36 together with the leak detection cable 34. The chemical bag 64 is buried in the ground and acts as a sacrificial anode in the usual way.

It will be appreciated that the system of the present invention specifically lends itself to replacement of the sensor cable without any excavation, and the system can be filled with water, causing the petroleum product to float out through the test point. The water may be pumped out from the system, and a new cable installed and the system reactivated. This technique is particularly attractive in the case of large tanks, which are frequently repaired from the inside for example by re-welding previously cracked welds, or welding plates over leak locations.

FIGS. 9 and 10 illustrate a preferred form of secondary containment system of the present invention. A cylindrical tank 30, preferably without lifting lugs, is wrapped in a body sheet 32 of HDPE the sheet 32 is rectangular when flat and is of sufficient width and length to completely cover the tank except for the ends. As before the sheet 32 is wrapped around the tank and welded in place. Between the tank 30 and the body sheet 32 are a geotextile absorber 120 and a drainage mesh 121. The mesh 121 provides channels for the flow of leakage from the tank 30 to the absorber 120 which ensures that any leakage is retained in the vicinity of the leak sensor located in one of the end caps 122. The end caps 122 and 123 are welded to the body sheet to complete the secondary containment system. In place of the drainage mesh, the interior surface of the body sheet could be suitably ribbed to provide the required flow channels. Thus, even if punctured by a sharp object, leakage will flow to the leak sensor. The tank should be installed with the end containing the leak sensor lower than the other end, to assist in early detection of leakage. One of the end caps 122 is provided with a perforated tube or well in which the leak sensor may be located.

While electronic monitoring of leakage is obviously superior to other methods, the presence of leakage in the perforated tube or well may be detected if required by a dipstick or other device. Such manual systems are undesirable as they require an operator to perform the test at the tank site. Electronic sensing is adapted for remote installation location, and without the presence of supervisory personnel on site.

I claim:

1. In a method of detecting and containing leakage from a subterranean container such as a tank containing a liquid petroleum product such as gasoline or heating oil, the improvement comprising:
   positioning leak sensing means adjacent said container, said leak sensing means including at least two electrical conductors separated by insulation which is subject to degradation by said liquid petroleum product,
   enclosing said leak sensing means and said container together in an enclosure of linear HDPE impervious to said product,
   sealing said enclosure to contain leakage from within said container and to prevent the ingress of petroleum products due to accidental spillage or from other sources of petroleum product
   burying said enclosure containing said container and said leak sensing means, connecting said leak sensing means to means for remotely detecting changes in the electrical characteristics of said leak sensing means due to degradation of said insulation, and
   detecting said degradation due to leakage from said container into said enclosure.

2. A method as in claim 1, wherein said enclosure contains chemical corrosion inhibitors.

3. A method as in claim 1, in which said tank is a bare steel tank.

4. In a method of detecting and containing leakage from a subterranean tank containing a petroleum product, such as gasoline or heating oil, the improvement comprising:
   positioning adjacent said tank an electrical leak detecting cable of the type having insulation which is subject to degradation by said petroleum product,
   enclosing said cable and said tank together in a linear HDPE enclosure impervious to said product,
   sealing said enclosure to contain leakage from within said tank and to prevent the ingress of said product due to accidental spillage or from other sources of said products,
   burying said enclosure containing said tank and said leak sensing means,
   connecting said leak detecting cable to monitoring means sensitive to changes in the electrical characteristics of said leak detecting cable due to degradation of said insulation, and
   detecting said degradation due to leakage from said tank into said enclosure by detecting a change in the electrical characteristics of said leak detecting cable.

5. A method as in claim 4, wherein said enclosure contains chemical corrosion inhibitors.

6. A method as in claim 4, in which said tank is a bare steel tank.

7. In a system for detection and containment of leakage of a petroleum product from a subterranean tank, the combination with said tank of:
   leak sensing means positioned adjacent said tank and being capable of sensing said petroleum product, said leak sensing means comprising a twisted pair of electrical conductors, each insulated with an insulation degradable by said petroleum product, one end of each conductor of said pair of conductors extending above said tank for connection to monitoring means sensitive to a decrease in the interconductor resistance of said twisted pair, the other ends of said conductors being connected to a terminating resistor, and
   a linear HDPE enclosure impervious to said product sealingly enclosing said tank and said sensing means for preventing sensing by said sensing means of petroleum products outside said enclosure while allowing sensing thereby of petroleum product leaks from said tank.

8. A system as in claim 7, which said enclosure contains chemical corrosion inhibitors.

9. A system as in claim 7, in which said tank is a bare steel tank.

10. A secondary containment system for a cylindrical underground petroleum storage tank comprising a body sheet, a pair of end caps, a drainage mesh, a geotextile and a leak sensor;
    said body sheet having a rectangular shape when flat and a length and width to be wrapped completely around said tank, said body sheet being formed of linear HDPE in a thickness of about 0.10 inches and, said body sheet being wrapped and welded to itself on said tank to form a sleeve thereabout;
    said end caps being formed of HDPE in a shape to cover the ends of said tank and extend over and be welded to said body sheet, at least one end cap being provided with an opening to admit said leak sensor;

said drainage mesh being located between said body sheet and said tank to provide drainage channels for leakage from said tank to flow to the bottom of said wrapped body sheet;

said geotextile being placed along the bottom of said tank between said tank and said body sheet, to absorb and hold leaking petroleum for detection by said leak sensor.

11. A secondary containment system as claimed in claim 10, said leak sensor including a twisted pair of electrical conductors, each insulated with an insulation degradable by petroleum, said conductors being connected to a terminating resistor and to a monitor to detect a substantial decrease in interconductor resistance of said twisted pair, to provide an alarm indicating a leak in said tank.

12. A secondary containment system as claimed in claim 10, wherein said leak sensor is positioned in a perforated duct inside one of said end caps.

13. A secondary containment system for a cylindrical underground petroleum storage tank comprising a body sheet, a pair of end caps, a geotextile, and a leak sensor;

said body sheet having rectangular shape when flat and a length and width to be wrapped completely around said tank, said body sheet being formed of linear HDPE in a thickness of about 0.10 inches said body sheet being wrapped on said tank and welded to itself to form a sleeve thereabout; the interior face of said body sheet being textured to provide drainage channels for leakage from said tank;

said end caps being formed of HDPE in a shape to cover the ends of said tank and extend over and be welded to said body sheet, at least one end cap being provided with an opening to admit said leak sensor;

said geotextile being placed along the bottom of said tank between said tank and said body sheet, to absorb and hold leaking petroleum for detection by said leak sensor.

* * * * *